United States Patent
Menou et al.

(10) Patent No.: US 11,492,999 B2
(45) Date of Patent: Nov. 8, 2022

(54) BYPASS TURBOFAN ENGINE COMPRISING MOBILE DEFLECTORS

(71) Applicant: Airbus Operations SAS, Toulouse (FR)

(72) Inventors: Fabien Menou, Toulouse (FR); Stéphanie Fesquet, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 46 days.

(21) Appl. No.: 17/209,323

(22) Filed: Mar. 23, 2021

(65) Prior Publication Data
US 2021/0301762 A1 Sep. 30, 2021

(30) Foreign Application Priority Data

Mar. 25, 2020 (FR) ...................................... 2002895

(51) Int. Cl.
*F02K 1/72* (2006.01)
*F02K 1/76* (2006.01)
*B64D 29/06* (2006.01)

(52) U.S. Cl.
CPC ................ *F02K 1/72* (2013.01); *F02K 1/763* (2013.01); *B64D 29/06* (2013.01); *F05D 2220/323* (2013.01); *F05D 2260/50* (2013.01)

(58) Field of Classification Search
CPC . F02K 1/72; F02K 1/763; B64D 29/06; F05D 2260/50; F05D 2260/53
See application file for complete search history.

(56) References Cited

U.S. PATENT DOCUMENTS

| | | | | |
|---|---|---|---|---|
| 3,500,646 A | * | 3/1970 | Hom | F02K 1/72 239/265.29 |
| 4,356,973 A | * | 11/1982 | Lawson | F02K 1/76 74/109 |
| 4,527,391 A | * | 7/1985 | Marx | F02K 1/76 239/265.29 |
| 10,309,343 B2 | | 6/2019 | Gormley | |

(Continued)

FOREIGN PATENT DOCUMENTS

| | | |
|---|---|---|
| EP | 3181948 A2 | 6/2017 |
| FR | 3057619 A1 | 4/2018 |

OTHER PUBLICATIONS

French Search Report; priority document.

*Primary Examiner* — Andrew H Nguyen
(74) *Attorney, Agent, or Firm* — Greer, Burns & Crain, Ltd.

(57) ABSTRACT

A bypass turbofan engine comprising a nacelle surrounding a flow path for a secondary flow and comprising a fixed structure, a mobile assembly with a slide capable of translational movement on the fixed structure and bearing a mobile cowl and a frame capable of translational movement on the fixed structure and bearing deflectors. The mobile assembly is able to move between a forward position and a retreated position making it possible to open a passage between the flow path and the outside through the deflectors. A differentiation mechanism ensures a length of travel of the slide that is different from the length of travel of the frame, and actuators providing a translational travel of the slide. Fitting a differentiation mechanism means that the length of travel of the deflectors with respect to the length of travel of the mobile cowl can be regulated.

3 Claims, 3 Drawing Sheets

(56) References Cited

U.S. PATENT DOCUMENTS

2013/0062433 A1* 3/2013 Vauchel ................. B64D 29/06
                                                    239/265.19
2016/0153399 A1   6/2016 Sawyers-Abbott et al.
2017/0167440 A1   6/2017 Aten
2017/0342941 A1* 11/2017 Mears ..................... F02K 3/06

* cited by examiner

BYPASS TURBOFAN ENGINE COMPRISING MOBILE DEFLECTORS

CROSS-REFERENCES TO RELATED APPLICATIONS

This application claims the benefit of the French patent application No. 2002895 filed on Mar. 25, 2020, the entire disclosures of which are incorporated herein by way of reference.

FIELD OF THE INVENTION

The present invention relates to a bypass turbofan engine for an aircraft comprising a mobile cowl and mobile deflectors, and to an aircraft comprising at least one such bypass turbofan engine.

BACKGROUND OF THE INVENTION

An aircraft comprises a fuselage, on each side of which is fixed a wing. Suspended beneath each wing is at least one bypass turbofan engine. Each bypass turbofan engine is fixed beneath the wing via a pylon which is fixed between the structure of the wing and the structure of the bypass turbofan engine.

The bypass turbofan engine comprises an engine and a nacelle which is fixed around the engine. The bypass turbofan engine comprises a fan which is in front of the engine and which draws external air from the front towards the rear of the bypass turbofan engine. Behind the fan, the air splits into a primary flow which follows a primary flow path through the engine and a secondary flow which flows a secondary flow path between the engine and the nacelle.

The nacelle comprises a fixed structure to which the fan and the engine and certain fixed cowls of the nacelle are fixed. The nacelle also comprises mobile cowls which travel along the fixed structure between a forward position and a retreated position. In the retreated position which corresponds to reversal of the thrust from the bypass turbofan engine, a passage is opened between the secondary flow path and the outside in order to remove the air from the secondary flow path.

For best guidance of the air towards the front, deflectors (also referred to as "cascades") are fixed to the mobile cowls and travel with these so that they can be positioned across the passage.

The length of travel of the deflectors is equal to the length of travel of the mobile cowl to which they are fixed and, in certain configurations, it may be desirable to have different lengths and it is therefore desirable to find a specific mechanism for this.

SUMMARY OF THE INVENTION

One object of the present invention is to propose a bypass turbofan engine for an aircraft comprising a mobile cowl and mobile deflectors, the lengths of travel of which are different.

To this end, what is proposed is a bypass turbofan engine comprising an engine with a fan casing and a nacelle surrounding the engine in which a flow path for a secondary flow is delimited between the nacelle and the engine, the nacelle comprising:
a fixed structure,
a mobile assembly with a slide capable of translational movement on the fixed structure and bearing a mobile cowl and a frame capable of translational movement on the fixed structure and bearing deflectors, in which the mobile assembly is able to move between a forward position in which the slide is positioned in such a way that the mobile cowl is close to the fan casing and a retreated position in which the slide is positioned in such a way that the mobile cowl is distanced from the fan casing in order between them to define an open passage between the flow path and the outside of the nacelle through the deflectors,
at least one differentiation mechanism which is configured in such a way as to ensure a length of travel of the slide that is different from the length of travel of the frame, and
a set of actuators designed to ensure, starting from the forward position, a translational travel of the slide as far as the retreated position and vice versa,
in which each differentiation mechanism comprises a shaft mounted on the fixed structure and free to rotate about its axis, a first pinion and a second pinion which are fixed to the shaft and coaxial with the axis, a first rack solid with the slide and meshing with the first pinion, a second rack solid with the frame and meshing with the second pinion, and in which the diameter of the first pinion and the diameter of the second pinion are different.

Fitting a differentiation mechanism means that the length of travel of the deflectors with respect to the length of travel of the mobile cowl can be regulated.

Advantageously, the diameter of the second pinion is smaller than the diameter of the first pinion.

The invention also proposes an aircraft comprising at least one bypass turbofan engine according to one of the above variants.

BRIEF DESCRIPTION OF THE DRAWINGS

The abovementioned features of the invention, together with others, will become more clearly apparent on reading the following description of one exemplary embodiment, the description being given in connection with the attached drawings, among which.

DETAILED DESCRIPTION OF THE PREFERRED EMBODIMENTS

Figure 1:
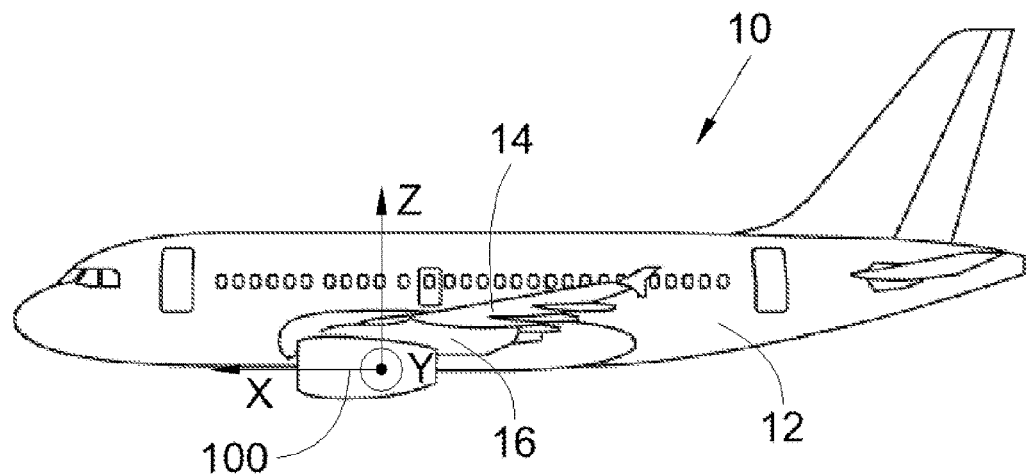
FIG. 1 is a side view of an aircraft comprising a turbofan engine according to the invention.

In the description which follows, terms relating to a position are considered with reference to an aircraft in a position of forward motion as depicted in FIG. 1.

FIG. 1 shows an aircraft 10 which comprises a fuselage 12, on each side of which is fixed a wing 14 which bears at least one bypass turbofan engine 100 according to the invention. The bypass turbofan engine 100 is fixed beneath the wing 14 via a pylon 16.

Figure 2:
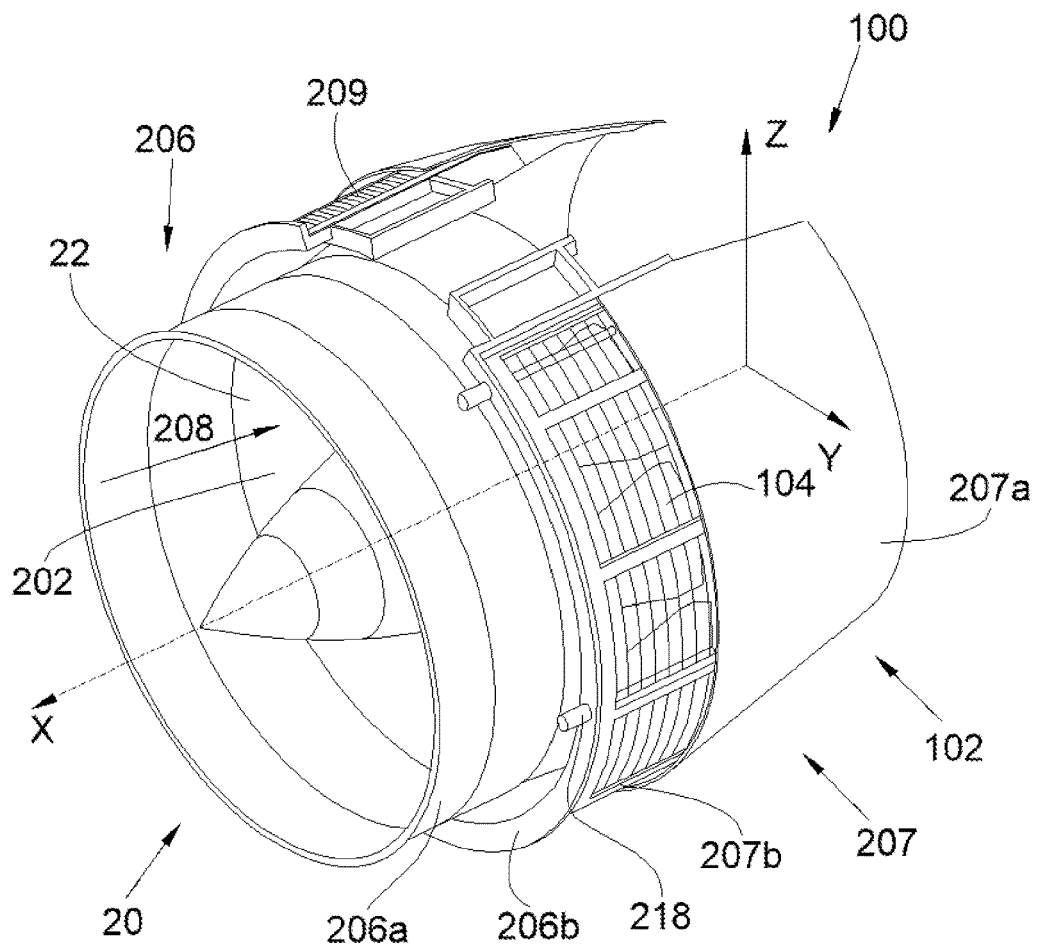
FIG. 2 is a perspective view of the turbofan engine according to the invention.

FIG. 2 shows the bypass turbofan engine 100 which has a nacelle 102 and an engine 20 housed inside the nacelle 102 and which comprises a fan casing 206a. The engine 20 is embodied here by its nose cone and its fan 22 inside the air intake of the nacelle 102.

In the description which follows, and by convention, the longitudinal axis of the bypass turbofan engine 100 which is parallel to the longitudinal axis of the aircraft 10 oriented positively in the direction of forward travel of the aircraft 10 is referred to as X, the transverse axis which is horizontal when the aircraft is on the ground is referred to as Y, and the vertical axis which is vertical when the aircraft is on the ground is referred to as Z, these three axes X, Y and Z being mutually orthogonal.

The bypass turbofan engine 100 has, between the nacelle 102 and the engine 20 and behind the fan 22, a flow path 202 through which there flows the secondary flow 208 coming from the air intake through the fan 22.

The nacelle 102 has a fixed structure 206 which is mounted fixedly on the fan casing 206a. The fixed structure 206 is made up of a front frame 206b mounted around the fan casing 206a and fixed thereto.

The nacelle 102 has a mobile assembly 207 which has a slide 207b which, in this instance, takes the form of a cylinder with openwork walls and a mobile cowl 207a forming the walls of the nozzle and borne by the slide 207b. The mobile cowl 207a is fixed to the rear of the slide 207b.

The slide 207b is mounted with the ability to move translationally in a direction of translational movement parallel overall to the longitudinal axis X on the fixed structure 206 of the nacelle 102.

The mobile assembly 207 is able to move between a forward position and a retreated position and vice versa. In the forward position, the slide 207b is positioned as far forward as possible so that the mobile cowl 207a is close to the fan casing 206a. In the retreated position, the slide 207b is positioned as far to the rear as possible so that the mobile cowl 207a is distanced from the fan casing 206a.

In the forward position, the mobile cowl 207a and the fan casing 206a are the prolongation of one another thereby defining the exterior surface of the flow path 202.

In the retreated position, the mobile cowl 207a and the fan casing 206a are distant from one another and between them define a passage open between the flow path 202 and the outside of the nacelle 102 and so the air from the secondary flow 208 passes through the passage to reach the outside of the nacelle 102.

The fan casing 206a delimits the front of the passage and the mobile cowl 207a delimits the rear of the passage.

In the embodiment of the invention, shown in FIG. 2, the nacelle 102 comprises a plurality of reverser flaps 104 distributed over the periphery of the nacelle 102 according to the angular opening of the passage around the longitudinal axis X.

Each reverser flap 104 is, in this instance, mounted in an articulated manner on the slide 207b, so it can be articulated between a deployed position and a retracted position, and vice versa.

The deployed position is adopted when the slide 207b is in the retreated position. The retracted position is adopted when the slide 207b is in the forward position.

In the deployed position, the reverser flap 104 is positioned across the flow path 202 to block the flow of the secondary flow 208 and direct it towards the passage. In the retracted position, the reverser flap 104 is out of the flow path 202 and does not impede the progress of the secondary flow 208 between the front and the rear.

The movement of each reverser flap 104 from the retracted position to the deployed position and vice versa is achieved using any appropriate mechanism known to those skilled in the art comprising, for example, linkages, racks, actuators, etc. The mechanism is designed to cause the reverser flaps 104 to transition from the retracted position to the deployed position when the slide 207b transitions from the forward position to the retreated position, and vice versa.

Figure 3:
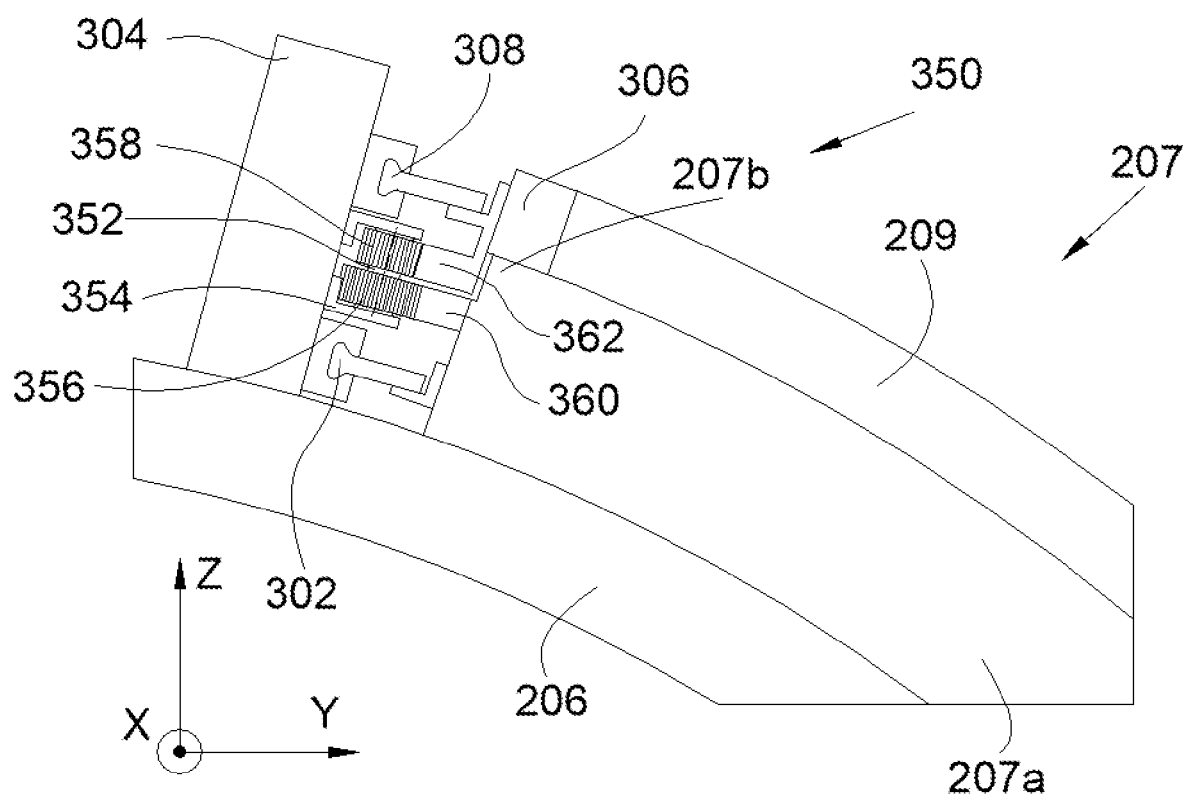
FIG. 3 is a face-on view of a differentiation mechanism according to the invention that allows the travel of the deflectors to be differentiated from the travel of the mobile cowl.
Figure 4:
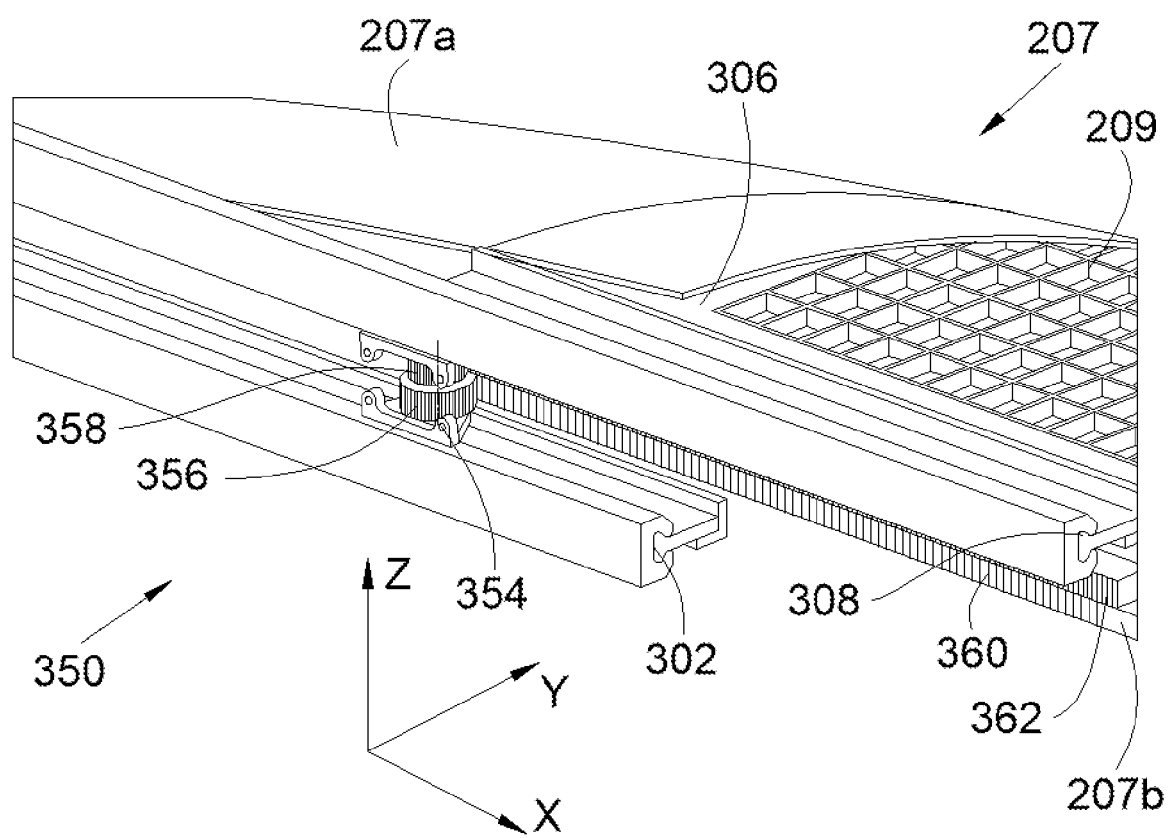
FIG. 4 is a perspective view of the differentiation mechanism of FIG. 3.

As shown in FIGS. 3 and 4, the slide 207b is guided with respect to the fixed structure 206 by a first guide system here comprising a collection of guideways 302 which in this instance are fixed to a 12 o'clock beam 304 and to a 6 o'clock beam, not visible, of the fixed structure 206. Of course, any other guide system is possible, such as a rail, for example.

The movement of the slide 207b along the fixed structure 206 is brought about by an actuating system comprising here of actuators 218 and controlled by a control unit, such as a controller, for example of the processor type, which controls the movements in one direction or the other according to the needs of the aircraft 10. Each actuator 218 is thus designed to bring about, starting from the forward and closed position, a translational travel of the slide 207b as far as the retreated position, and vice versa. Each actuator 218 may, for example, adopt the form of a double-acting ram with a telescopic rod, or of a motor meshing with a rack.

The mobile assembly 207a also comprises a frame 306 and a set of deflectors 209 fixed to the frame 306 which is also able to move between a forward position and a retreated position and vice versa, corresponding to the forward and retreated positions of the slide 207b. The frame 306 is mounted with the ability to move on the fixed structure 206, in this instance also between the 12 o'clock beam 304 and the 6 o'clock beam.

The frame 306 is guided with respect to the fixed structure 206 by a second guide system here comprising a collection of guideways 308. Of course, any other guide system is possible, such as a rail for example.

In the forward position, the deflectors 209 are hidden by the mobile cowl 207a or by the fan casing 206a. In the retreated position, the deflectors 209 are positioned across the passage to guide the air of the secondary flow 208 towards the outside.

To ensure different travel between the slide 207b and the frame 306, the nacelle 102 comprises a differentiation mechanism 350 which is configured to ensure a length of travel of the slide 207b different from the length of travel of the frame 306, and, in particular, a length of travel of the slide 207b that is longer than the length of travel of the frame 306.

FIGS. 3 and 4 depict just one differentiation mechanism 350, but for greater stability there is a differentiation mechanism 350 at each end of the slide 207b, namely in this instance at the 12 o'clock beam 304 and at the 6 o'clock beam.

Thus, in the transition from a forward position to a retreated position, the slide 207b and therefore the mobile cowl 207a, retreats further towards the rear than the frame 306 and therefore the deflectors 209. Conversely, in the transition from the retreated position to the forward position, the slide 207b and therefore the mobile cowl 207a advances further towards the front than the frame 306 and therefore the deflectors 209, allowing a space saving for storing the deflectors in the forward position.

In the embodiment of the invention depicted in FIGS. 3 and 4, the differentiation mechanism 350 comprises a shaft 352 mounted on the fixed structure 206 and free to rotate about its axis which is oriented radially with respect to the longitudinal axis X and which is referred to as "axis of rotation".

The shaft 352 is held in position here by two brackets 354 fixed to the fixed structure 206 and more particularly here to the beams 304. These brackets 354 allow the shaft 352 to rotate.

The differentiation mechanism 350 also comprises a first pinion 356 and a second pinion 358 which are fixed to the shaft 352 and are coaxial with the axis of rotation. The two pinions 356 and 358 therefore rotate at the same speed.

The differentiation mechanism 350 also comprises a first rack 360 solid with the slide 207b and which meshes with the first pinion 356.

The differentiation mechanism 350 also comprises a second rack 362 solid with the frame 306 and which meshes with the second pinion 358.

The first rack 360 and the second rack 362 are therefore parallel.

In order to generate different travels for the slide 207b and for the frame 306, the diameter of the first pinion 356 and the diameter of the second pinion 358 are different.

Of course, in order to stop one of the pinions 356, 358 from continuing to mesh with the rack 360, 362, the lengths of the racks 360 and 362 are adapted accordingly and, in particular, the rack 360 which will have the longest travel will be the longest.

According to one particular embodiment, the diameter of the second pinion 358 is smaller than the diameter of the first pinion 356. According to one particular embodiment, for a travel of 1070 mm of the slide 207b and for a travel of 781 mm of the frame 306, the diameter of the second pinion 358 is 48 mm and the diameter of the first pinion 356 is 65.8 mm.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A bypass turbofan engine comprising an engine with a fan casing and a nacelle surrounding the engine in which a flow path for a secondary flow is delimited between the nacelle and the engine, said nacelle comprising:
    a fixed structure,
    a mobile assembly with a slide configured to translationally move on the fixed structure and bearing a mobile cowl and a frame configured to translationally move on the fixed structure and bearing deflectors, in which the mobile assembly is able to move between a forward position in which the slide is positioned such that the mobile cowl is close to the fan casing and a retreated position in which the slide is positioned such that the mobile cowl is distanced from the fan casing in order between them to define an open passage between the flow path and the outside of the nacelle through the deflectors,
    at least one differentiation mechanism which is configured such as to ensure a length of travel of the slide that is different from a length of travel of the frame, and
    a set of actuators configured to ensure, starting from the forward position, a translational travel of the slide as far as the retreated position and vice versa,
    wherein each differentiation mechanism comprises a shaft mounted on the fixed structure and free to rotate about an axis of the shaft, a first pinion and a second pinion which are fixed to said shaft and coaxial with said axis, a first rack solid with the slide and meshing with the first pinion, a second rack solid with the frame and meshing with the second pinion, and in which a diameter of the first pinion and a diameter of the second pinion are different.

2. The bypass turbofan engine according to claim 1, wherein the diameter of the second pinion is smaller than the diameter of the first pinion.

3. An aircraft comprising at least one bypass turbofan engine according to claim 1.

* * * * *